United States Patent
Park

(10) Patent No.: US 7,899,974 B2
(45) Date of Patent: Mar. 1, 2011

(54) NONVOLATILE MEMORY, MAPPING CONTROL APPARATUS AND METHOD OF THE SAME

(75) Inventor: Hyung-seok Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 214 days.

(21) Appl. No.: 11/330,074

(22) Filed: Jan. 12, 2006

(65) Prior Publication Data

US 2006/0200617 A1    Sep. 7, 2006

(30) Foreign Application Priority Data

Jan. 12, 2005   (KR) .................. 10-2005-0002960

(51) Int. Cl.
  *G06F 12/00*    (2006.01)
(52) U.S. Cl. .................. 711/103; 711/209; 711/E12.008
(58) Field of Classification Search .................. None
  See application file for complete search history.

(56) References Cited

U.S. PATENT DOCUMENTS

| | | | |
|---|---|---|---|
| 6,604,168 B2 * | 8/2003 | Ogawa ..................... | 711/103 |
| 6,629,191 B1 * | 9/2003 | Katayama et al. ........... | 711/103 |
| 7,058,784 B2 * | 6/2006 | Wang ..................... | 711/171 |
| 7,287,117 B2 * | 10/2007 | Chung et al. .................. | 711/103 |
| 2002/0181315 A1 * | 12/2002 | Lee et al. .................. | 365/230.06 |
| 2003/0041210 A1 | 2/2003 | Keays | |
| 2005/0141273 A1 * | 6/2005 | Park et al. ................. | 365/185.12 |
| 2006/0120166 A1 * | 6/2006 | Kim et al. ................. | 365/185.33 |

FOREIGN PATENT DOCUMENTS

| | | |
|---|---|---|
| JP | 11-003270 A | 1/1999 |
| JP | 2002-366420 A | 12/2002 |
| KR | 2001-0037155 A | 5/2001 |
| KR | 10-2002-92487 A | 12/2002 |
| KR | 2001-0092261 A | 12/2002 |
| KR | 2003-0095438 A | 12/2003 |
| KR | 10-2004-0038708 A | 5/2004 |

* cited by examiner

*Primary Examiner* — Kaushikkumar Patel
(74) *Attorney, Agent, or Firm* — Sughrue Mion, PLLC

(57) ABSTRACT

A nonvolatile memory and a mapping control apparatus and method of the same are disclosed, whereby block state information is changed depending on an operation performed by the nonvolatile memory to efficiently access a flash memory. The mapping control apparatus comprises a nonvolatile memory that has an area divided into blocks and stores block state information representing the state of written data, and a control unit that determines a block for a data operation through the block state information when the data operation is performed in the nonvolatile memory, and that updates the block state information depending on the result of the performed data operation.

13 Claims, 7 Drawing Sheets

NONVOLATILE MEMORY, MAPPING CONTROL APPARATUS AND METHOD OF THE SAME

CROSS-REFERENCE TO RELATED APPLICATION

This application claims priority from Korean Patent Application No. 10-2005-0002960 filed on Jan. 12, 2005 in the Korean Intellectual Property Office, the disclosure of which is incorporated herein by reference in its entirety.

BACKGROUND OF THE INVENTION

1. Technical Field

The present invention relates to a nonvolatile memory and a mapping control apparatus and method for the same, and more particularly, to a nonvolatile memory and a mapping control apparatus and method for the same whereby block state information is changed depending on an operation performed by the nonvolatile memory to efficiently access a flash memory.

2. Related Art

In the related art, embedded systems such as electronic home appliances, communication devices, and set top boxes widely employ a nonvolatile memory as a storage medium.

Nonvolatile memory has the advantages of both random access memory (RAM), which freely writes and erases data, and read only memory (ROM), which preserves stored data even in the case of no power supply. Also, the most commonly used related art flash memory is a nonvolatile memory device that can electrically write and erase data. The related art flash memory is suitable for portable devices because of its advantages of small size, lower power consumption than that of magnetic disc memories, and fast access time like hard drives.

The related art flash memory can arbitrarily access data stored in a specified position in the same manner as RAM, nonvolatile memory, and magnetic memory. However, in the case of correcting or erasing data, the flash memory accesses the data in a block unit, unlike related art memory devices. In other words, when the written data is corrected or erased, the block including the data is erased before the data is written.

The aforementioned related art memory supports a logical-physical mapping method that accesses data written in the flash memory through one logical address, even if a physical address is changed due to erasing before writing as above. In other words, this mapping method manages data that maps logical addresses and physical addresses regarding predetermined data through a predetermined mapping table. The mapping method is divided into a sector mapping method, a block mapping method, and a composite mapping method.

Hereinafter, bytes having physically successive addresses are referred to as a sector. "Sector" refers to a data unit of the flash memory. A block composed of a plurality of sectors can be erased by one erasure operation. At this time, the sector is a data operation unit in a small block of the flash memory. For reference, a plurality of sectors is used as a basic unit for data operation in a large block of the flash memory.

FIG. 1 briefly illustrates a sector mapping method of a flash memory according to the related art. The sector mapping method maintains mapping data in a sector of the flash memory in order to access a physical sector of the flash memory using logical sector data. For example, if a logical sector number (LSN) is designated as "9" along with a request for a write operation, an access device of the flash memory retrieves a physical sector number (PSN) 6 corresponding to LSN 9 by referring to the mapping table. Then, corresponding data is written in sector 6 of the flash memory. If other data is written in sector 6, the corresponding data is written in an empty physical sector of the flash memory, and the PSN corresponding to LSN 9 is changed in the mapping table.

FIG. 2 is a view illustrating a block mapping method of a flash memory according to the related art. The block mapping method maintains mapping data in a block unit of the flash memory and converts logical sector data into logical block data to access a physical sector of the flash memory using logical block data and offset data. For example, if an LSN is designated as "9" along with a request for a write operation, the access device of the flash memory obtains a logical block number (LBN) 9/4=2 corresponding to LSN 9, and then obtains a physical block number (PBN) corresponding to the LBN by referring to the mapping table.

At this time, the offset of the logical block coincides with the offset of the physical block so that data is written in a sector corresponding to offset 1 in the obtained PBN 1. If other data is written in a corresponding sector, the corresponding data is written in an empty physical sector of the flash memory by allowing the offsets to coincide with each other, and a PSN corresponding to LBN 2 in the mapping table is changed. At this time, effective data remaining in the existing PBN should be copied to a new PBN by allowing the offsets to coincide with each other.

FIG. 3 is a view illustrating a composite mapping method of a flash memory according to the related art. The composite mapping method performs mapping in a block unit in the same manner as the block mapping method, and then sector mapping data is stored in a physical block to implement sector mapping. For example, if an LSN is designated as "9" along with a request for a write operation, the access device of the flash memory obtains an LBN 9/4=2 corresponding to LSN 9, and then obtains a PBN corresponding to the LBN by referring to the mapping table. Then, the data is written in an empty sector of PBN 1, and LSN 9 is written therein.

This sector mapping method methods has a problem in that it is difficult for the sector mapping method to apply to the flash memory because of excessive mapping data maintained in a sector unit. In this respect, recent technology has been based on a related art block mapping method that requires less mapping data.

However, in the related art block mapping method, since offsets should coincide with each other, a new block should be provided to write data in one sector if one sector is frequently written to. Also, since effective data of another sector in the same block as well as a corresponding sector should be copied, write and erase operations frequently occur, thereby significantly deteriorating system throughput.

Furthermore, in the composite mapping method, since the sector mapping data is stored after block mapping, it is not necessary to make offsets coincide with each other. However, a problem occurs in that a larger memory capacity is required in comparison with the block mapping method because a predetermined area of memory is required to write the sector mapping data.

The related art Korean Patent Unexamined Publication No. 2002-0092487 discloses a method for managing a flash memory in which a predetermined logic block is assigned to write data required for a write operation in the logic block in the procedure for updating data, so as not to degrade system throughput even when there are frequent data updates. However, this related art method has a limitation because a write/erase operation is required when moving the data stored in the logic block to a data block. Therefore, it is necessary to provide a method that can improve system throughput of the flash memory by reducing the number of write and erase operations.

SUMMARY OF THE INVENTION

The present invention provides a nonvolatile memory and a mapping control apparatus and method for the same whereby block state information changed depending on data operation is stored in a flash memory and the flash memory is efficiently controlled with reference to the written block state information during data operation.

According to an aspect of the present invention, there is provided a nonvolatile memory comprising a data area in which data is written, and a preliminary area in which block state information is written, the block state information representing the state of the data written in the data area and whether the written data is effective.

In another aspect of the present invention, there is provided a mapping control apparatus comprising a nonvolatile memory that has an area divided into blocks and store block state information representing the state of written data, and a control unit that determines a block for which the data operation is to be performed through the block state information when the predetermined data operation is performed in the nonvolatile memory, and updates the block state information depending on the result of the performed data operation.

In still another aspect of the present invention, there is provided a mapping control method comprising requesting a data operation through a predetermined logical sector number of a nonvolatile memory, and determining a block for which the data operation is to be performed through block state information of a physical block according to the logical sector number and updating the block state information depending on the result of the data operation.

BRIEF DESCRIPTION OF THE DRAWINGS

The above and other aspects of the present invention will be more apparent from the following detailed description of exemplary embodiments taken in conjunction with the accompanying drawings, in which.

DETAILED DESCRIPTION OF EXEMPLARY EMBODIMENTS OF THE INVENTION

Figure 1:
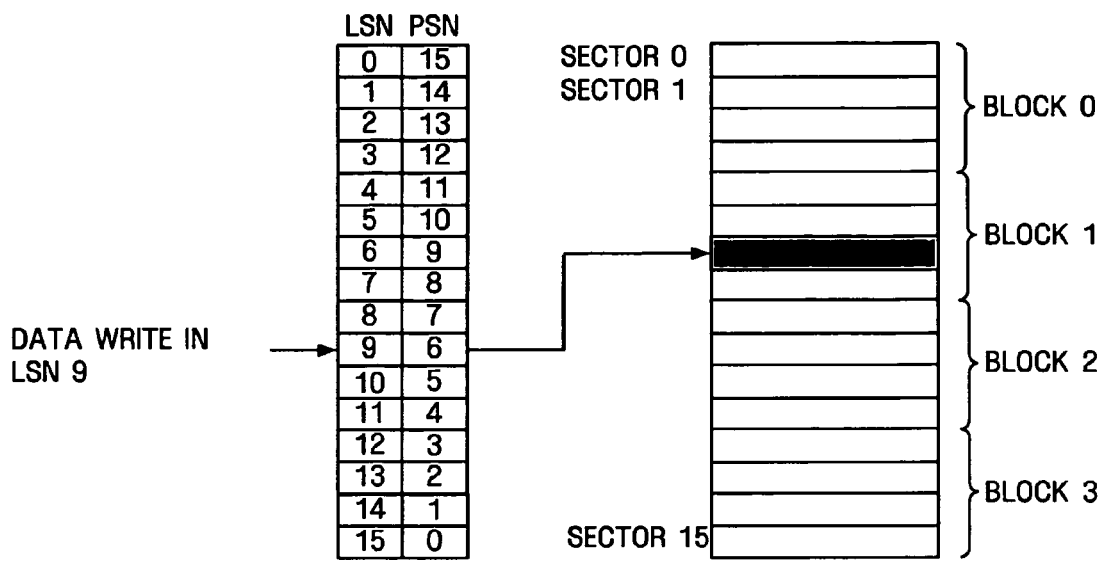
FIG. 1 is a view illustrating a sector mapping method of a flash memory according to the related art.
Figure 2:
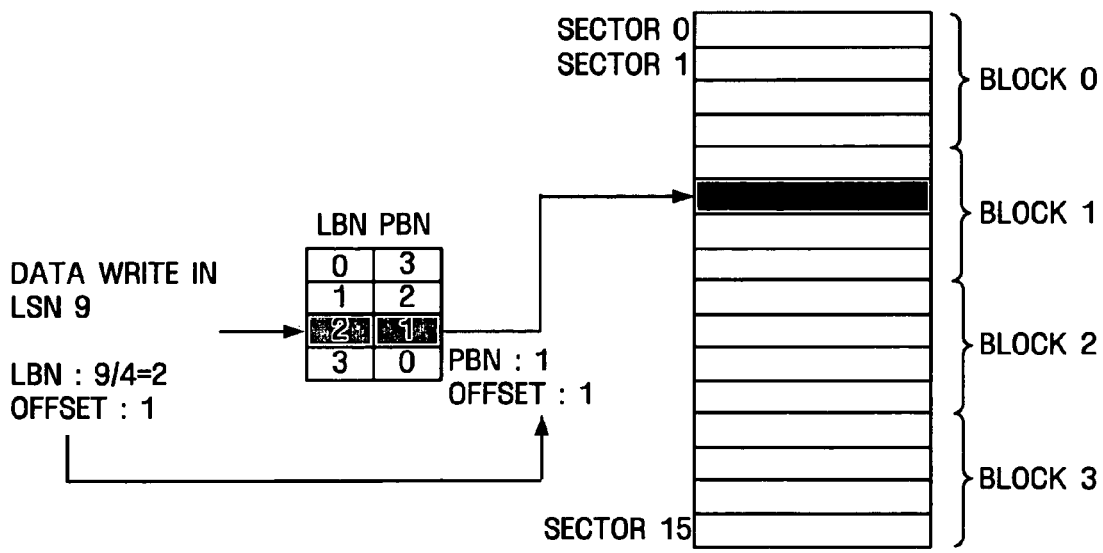
FIG. 2 is a view illustrating a block mapping method of a flash memory according to the related art.
Figure 3:
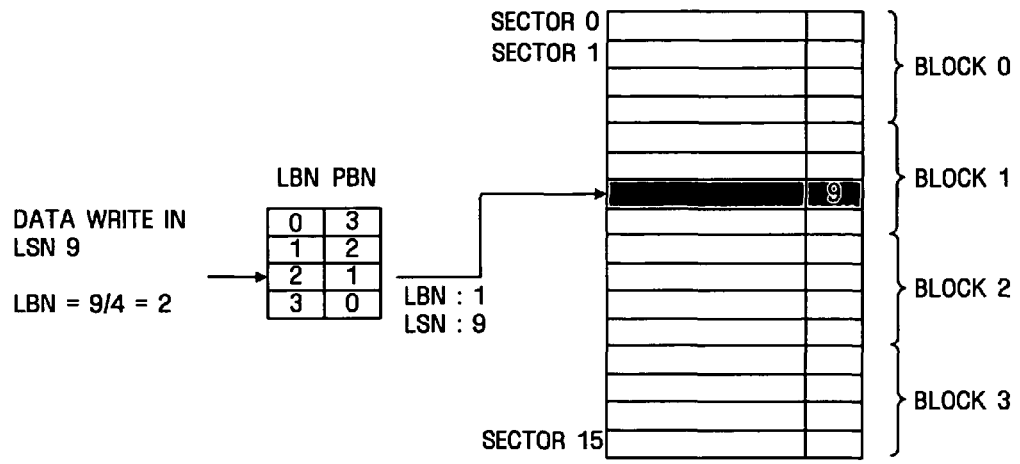
FIG. 3 is a view illustrating a composite mapping method of a flash memory according to the related art.

Hereinafter, exemplary embodiments of the present invention will be described in detail with reference to the accompanying drawings. The aspects and features of the present invention and methods for achieving the aspects and features will be apparent by referring to the exemplary embodiments to be described in detail with reference to the accompanying drawings. However, the present invention is not limited to the exemplary embodiments disclosed hereinafter, but can be implemented in diverse forms. The matters defined in the description, such as detailed construction and elements, are provided to assist those of ordinary skill in the art in a comprehensive understanding of the invention. The present invention is defined within the scope of appended claims. In the foregoing description, the same drawing reference numerals are used for the same elements across various figures.

Figure 4:
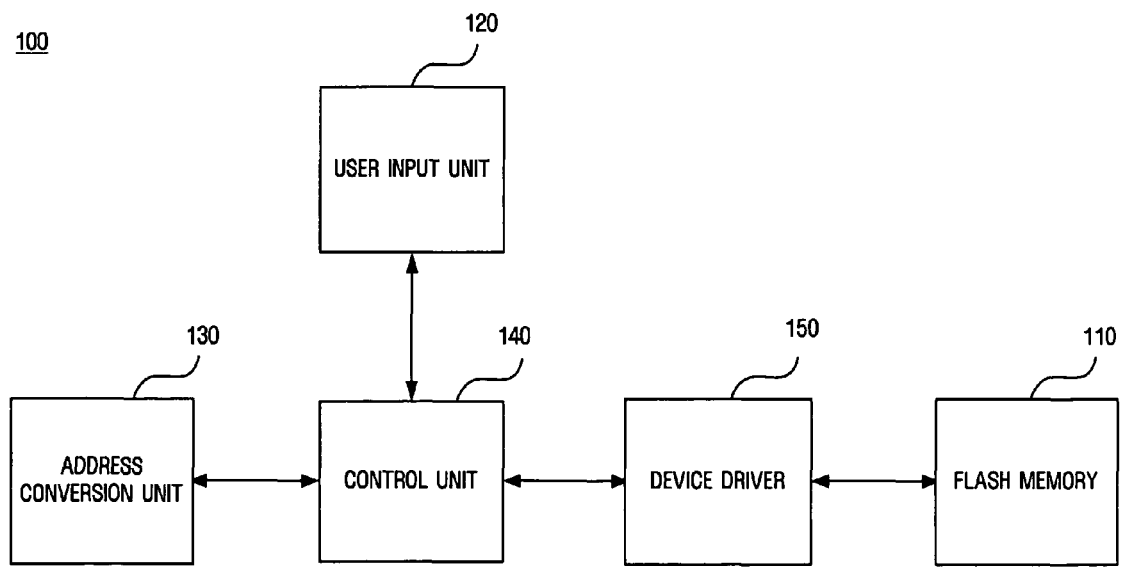
FIG. 4 is a view illustrating a mapping control apparatus of a flash memory according to an exemplary embodiment.

FIG. 4 is a view illustrating a mapping control apparatus of a nonvolatile memory according to an exemplary embodiment. A mapping control apparatus 100 of a nonvolatile memory 110 according includes a user input unit 120 to which a data operation request for a logical address is input from a user, an address conversion unit 130 for converting a logical address into a physical address, a control unit 140 that performs a data operation for the converted physical address in the nonvolatile memory 110 depending on the input request, and a device driver 150 that performs the data operation of the input request in the nonvolatile memory 110 under the control of the control unit 140.

A ROM, PROM, EPROM, EEPROM, or a flash memory may be used as the nonvolatile memory 110. However, the nonvolatile memory of the present invention is not limited to the above memories. Further, flash memory is used as the nonvolatile memory 110. Of course, it should be noted that the mapping control apparatus 100 is not limited to flash memory, and the aforementioned memories may be used as the nonvolatile memory according to the exemplary embodiment.

The flash memory 110 is divided into a small block flash memory and a large block flash memory. The small block flash memory is characterized by a logical operation unit being identical with a physical operation unit. By contrast, the large block flash memory is characterized by the physical operation unit being substantially larger than a logical operation unit.

The logical operation unit is referred to as a "sector" and corresponds to a flash memory unit of data requested by a user through a user program. Also, the physical operation unit is referred to as a "page" and corresponds to a unit of data actually stored in the flash memory. In this case, the terms "sector" and "page" are used for understanding. However, various other terms may be used depending on units used in the exemplary embodiment.

Figure 5:
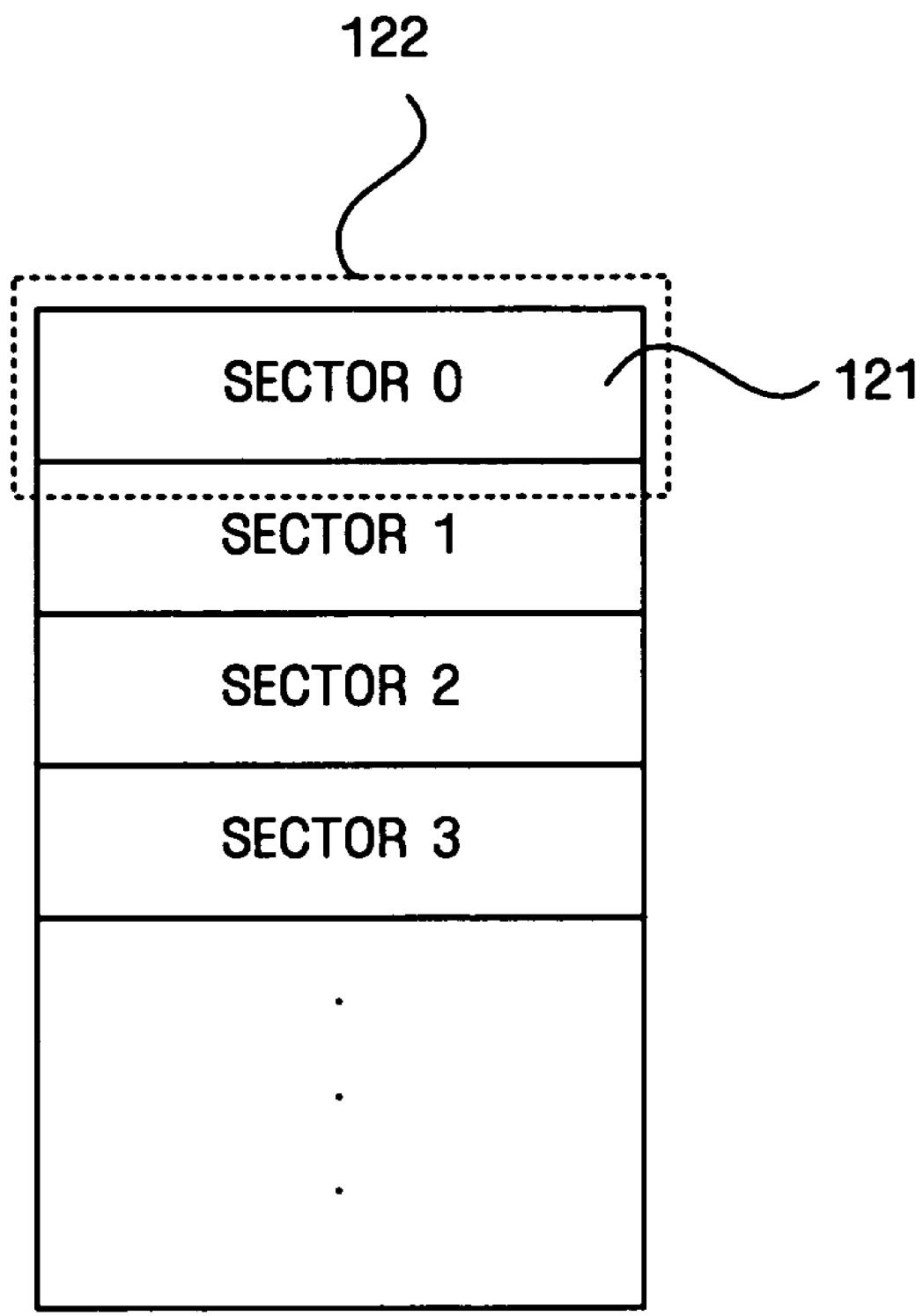
FIG. 5 is a view illustrating the construction of a small block flash memory according to an exemplary embodiment.

FIG. 5 is a view illustrating a construction of the small block flash memory according to an exemplary embodiment. A sector 121 corresponding to the logical operation unit is identical with a page 122 corresponding to the physical operation unit in the small block flash memory.

Figure 6:
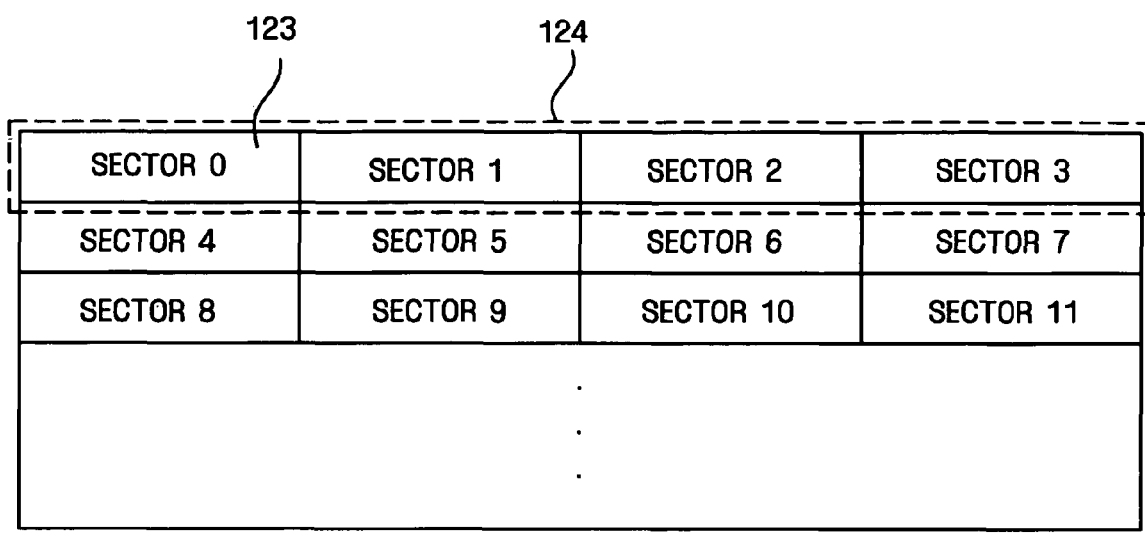
FIG. 6 is a view illustrating the construction of a large block flash memory according to an exemplary embodiment.

FIG. 6 is a view illustrating a construction of the large block flash memory according to an exemplary embodiment. A sector 123 corresponding to at least one logical operation unit constitutes a page 124 corresponding to one physical operation unit in the large block flash memory. For example but not by way of limitation, four sectors 123 constitute one page 124.

Figure 7:
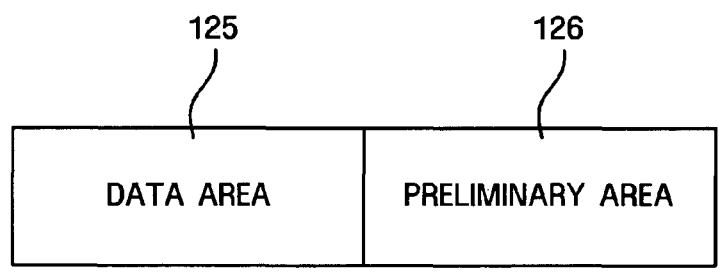
FIG. 7 is a view illustrating a data area and a preliminary area constituting a block of a flash memory according to an exemplary embodiment.

The flash memory represents the state of each block, and includes an area in which block state information can be written. The block state information determines a sector (for example but not by way of limitation, small block flash memory) and a page (for example but not by way of limitation, large block flash memory) for data operations. As shown in FIG. 7, the block in the flash memory may include a data area 125 for data operation and a preliminary area 126 for the block state information. The block state information is written in the preliminary area 126 so that the control unit 140 can perform data operations in a corresponding block with reference to the block state information written in the preliminary area 126.

In other words, if a data operation request is input from the user, the control unit 140 determines state data of each block changed by the data operation through a state transition algorithm, and updates the block state information written in the preliminary area of the flash memory 110 depending on the determined block state information.

In this case, the block state information is divided into a first state and a second state. The first state represents that data was written in the flash memory 110 in an initial state (where no data was previously written). The second state represents whether the written data is effective.

Hereinafter, the initial state of the flash memory 110 is referred to as "F," the first state is referred to as "M" or "N", and the second state is referred to as "O." Also, blocks having respective block states are referred to as "block F," "block M," "block N," and "O block." In this case, "F," "M," "N," "O," and other terms are used to assist with understanding. However, additional terms, figures, and symbols may be used as necessary.

Examples of the block state information in the exemplary embodiment include a block F in which no data is written, a block M in which sector offsets of the written data coincide with each other, a block N in which sector offsets of the written data do not coincide with each other, and a block O in which the written data is not effective any longer.

The control unit 140 additionally assigns block F to perform newly requested data operations if block M is currently in use, through the state transition algorithm. Then, the control unit 140 performs a swap merge operation such that new data is written in the assigned block F.

Furthermore, the control unit 140 additionally assigns a new F block to perform newly requested data write operations if block N is currently in use through the state transition algorithm. Then, the control unit 140 performs a smart merge operation in such a way that effective data among data written in the existing block N is only written in block F and the existing block N is converted to a block O. The data written in the new block F by such a smart merge operation has sector offsets that coincide with each other; then block F is converted to a block M. A block O is converted to a block F through an erase operation.

Figure 8:
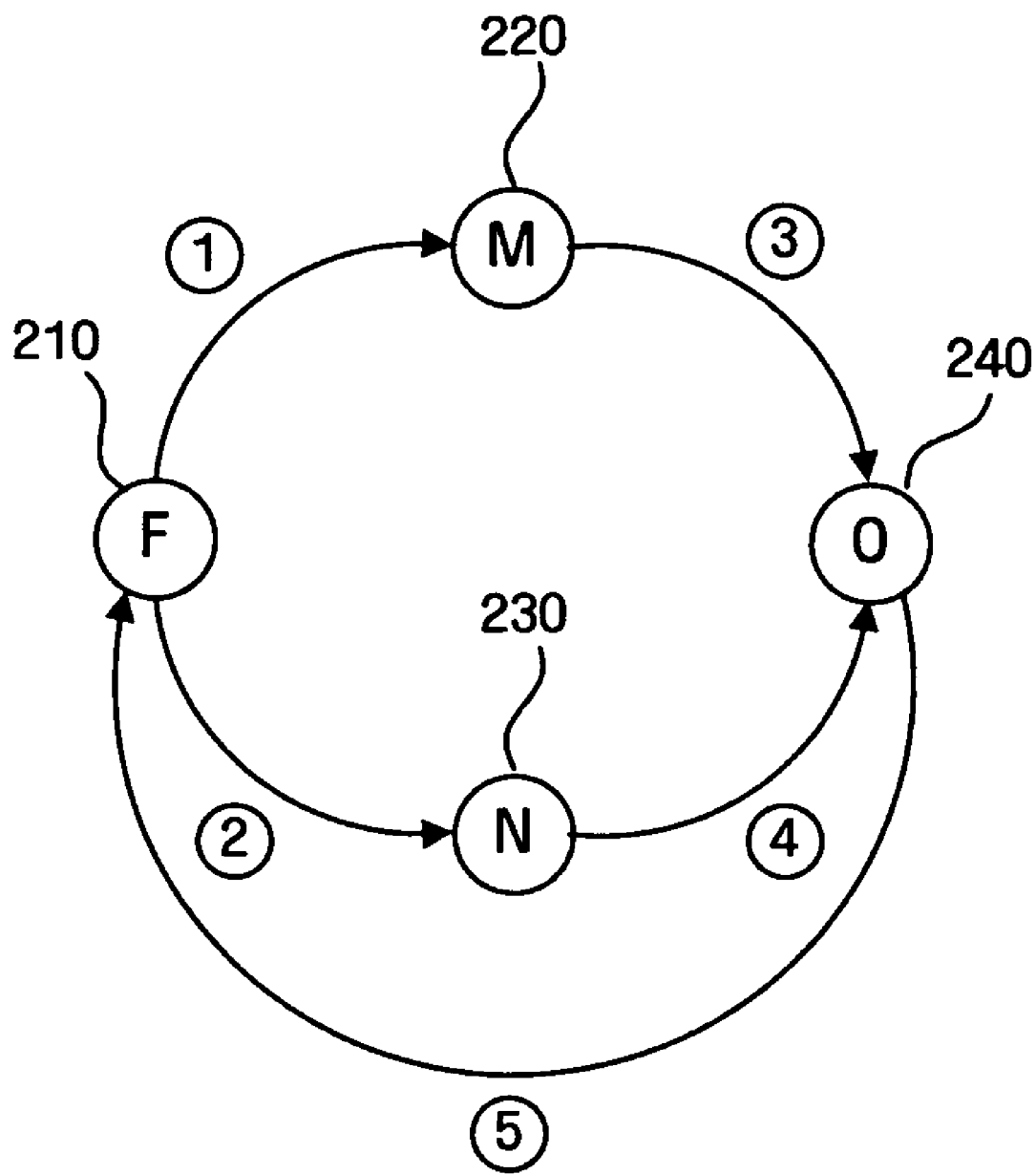
FIG. 8 is a view illustrating the procedure of state transition of block state information according to an exemplary embodiment.

FIG. 8 is a view illustrating the procedure of state transition of the block state information through the state transition algorithm according to an exemplary embodiment The block state starts from block F 210 in which no data is written in the flash memory 110. At this time, if a data write operation for block F 210 is requested by the user, block F 210 may be converted to block M 220 or block N 230 depending on the coincidence of offsets during data writing.

In the case of data writing, the data is sequentially written in a block of the small block flash memory and the large block flash memory. In other words, in the substantially same manner as the large block flash memory, the data is sequentially written in a block of the small block flash memory in both cases of offsets coinciding with each other and offsets not coinciding with each other. This represents an example of compatibility between the small block flash memory and the large block flash memory. Also, the inner block may be separately processed in the small block flash memory.

For example but not by way of limitation, when the user requests a data write operation using logical addresses "0" and "1," offsets coincide with each other if the logical addresses "0" and "1" are respectively converted into physical addresses "0" and "1" by the mapping table, so that the data is sequentially written in order starting from the physical address "0." Afterwards, when the user requests a data write operation using logical addresses "7" and "9," the logical addresses "7" and "9" are respectively converted into physical addresses "7" and "9" by the mapping table. Thus, the data is sequentially written in the physical addresses "2" and "3" without being written in the physical addresses "7" and "9", in which offsets coincide with each other.

Likewise, the data is written in a block of the large block flash memory in order starting from the first page. As described above, the data is written in order starting from the first sector or the first page of the block regardless of offset coincidence. This is because a previous sector or page may affect a next sector or page when a writing voltage is applied to a predetermined sector or page. In the exemplary embodiment, although it has been described that the data is sequentially written in order starting from the first sector or page of the corresponding block, data writing is not limited to this. The data may be sequentially written in reverse order starting from the last sector or page of the corresponding block. Alternatively, the data may be sequentially written in order starting from a sector or page of the corresponding block.

Therefore, if the data is written in a state where offsets coincide with each other, the corresponding block of the data is converted to a block M 220 (①). If the data is written in a state where offsets do not coincide with each other, the corresponding block of the data is converted to a block N 230 (②).

Furthermore, if the data of block M and the data of block N are not effective any longer, the control unit 140 transits the block state information to a block O 240 (③,④). At this time, block O is converted to a block F through an erase operation (⑤).

Meanwhile, the flash memory 110 is limited by the number of programming (NOP), i.e., the number of possible write operations. In other words, there is a limited number of write operations that can be performed on the data area 125 and the preliminary area 126 of the flash memory 110. Such a limitation is to prevent the life and throughput of the flash memory from being reduced.

For example but not by way of limitation, in the small block flash memory the number of write operations for the data area 125 and the number of write operations for the preliminary area 126 are two and three, respectively. In the large block flash memory, the number of write operations for the data area 125 and the number of write operations for the preliminary area 126 are both four.

To increase the life of the flash memory and ensure effectiveness of the written data, a recent trend is to decrease the number of write operations. In accordance with the recent trend, the number of write operations for the data area 125 and the preliminary area 126 is decreasing in both the small block flash memory and the large block flash memory. For example but not by way of limitation, the data area 125 and the preliminary area 126 in the small block flash memory and the large block flash memory respectively use one and two write operations, which is a decrease from the current technology. Therefore, the number of writes of the block state information in the preliminary area 126 should decrease in accordance with the decreased number of write operations.

In the flash memory according to the exemplary embodiment, block F is converted to a block M or a block N, and then block M or block N is converted to a block O. In this way, the transition procedure of the block state information is performed two times. Therefore, the block state information can be written in the flash memory in case of write operation of two times as well as four times.

For reference, the mapping control apparatus of the flash memory according to the exemplary embodiment may be provided such that each module is a hardware module, some modules are software modules, or each module is a software module. In the exemplary embodiment, software includes a set of instructions stored in a computer-readable medium; however, the present invention is not limited thereto, as other implementations of software as would be understood by one of ordinary skill in the art may be used.

Therefore, it should be apparent that the mapping control apparatus of the flash memory according to the exemplary embodiment comprises hardware and/or software without departing from the spirit or scope of the present invention. Also, it is should be apparent that various modifications and variations can be made in the mapping control without departing from the spirit or scope of the invention.

Hereinafter, a mapping control method of the flash memory according to the exemplary embodiment will be described. Since the initial procedure of the mapping control method is the same as the existing procedure, its description has been omitted.

Figure 9:
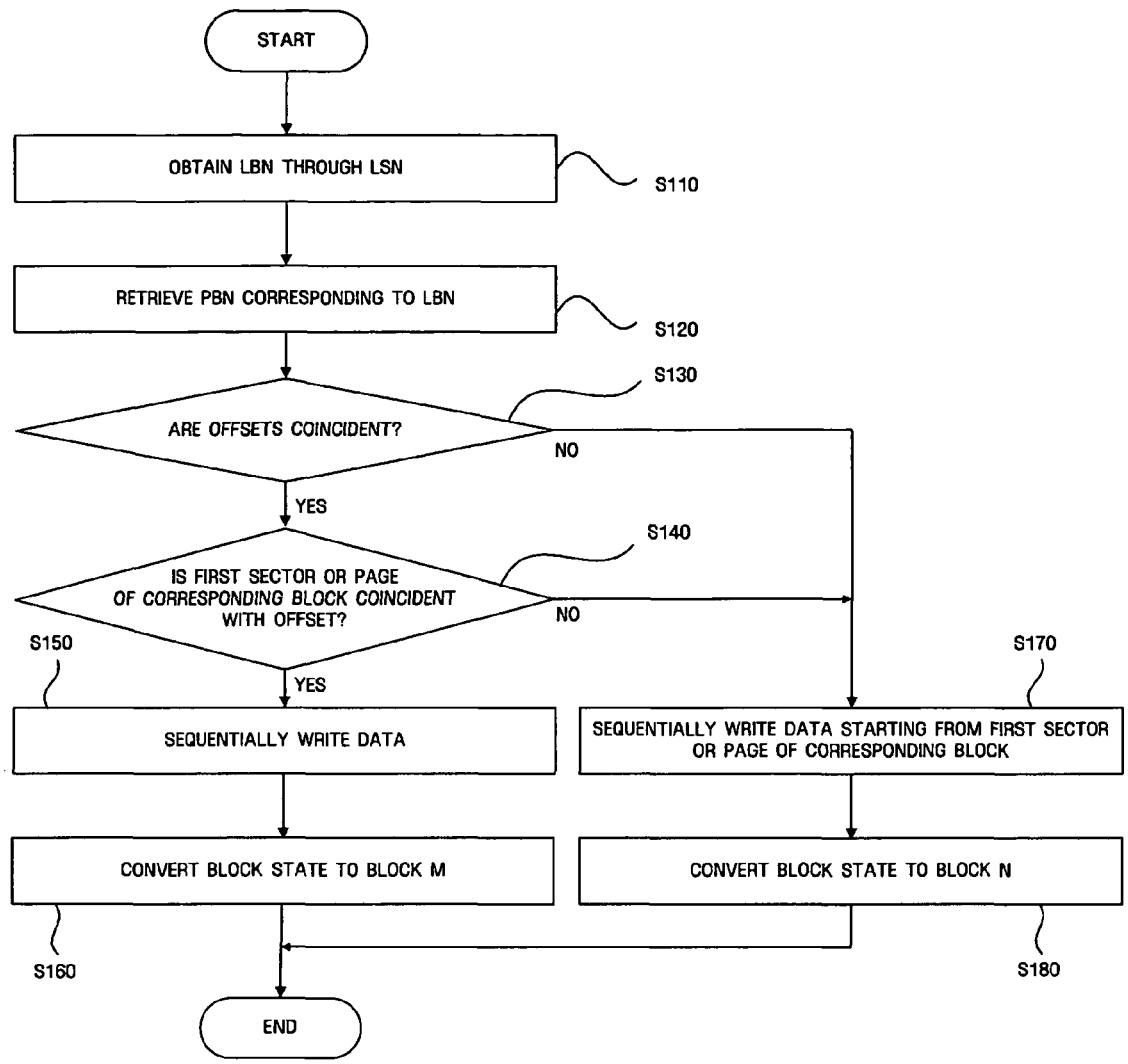
FIG. 9 is a view illustrating a method of writing data of a flash memory according to an exemplary embodiment.

FIG. 9 is a view illustrating a method of writing data through the mapping control method of the flash memory according to an exemplary embodiment. The control unit 150 obtains an LBN through an LSN if a data write operation is requested by the user using an LSN (S110).

The control unit 140 retrieves a PBN corresponding to the obtained LBN through the mapping table obtained in the initial procedure (S120). In the exemplary embodiment, the initial state of the flash memory is a block F, i.e., the case where no data has been written.

The control unit 140 then determines whether a sector or page coincident with the data offset of the requested write operation exists in the PBN (S130).

If the sector or page is coincident with the data offset of the requested write operation, the control unit 140 determines whether the first sector or page of a corresponding block is coincident with the data offset of the requested write operation (S140).

As a result, if the sector or page coincident with the data offset of the write operation exists, and the first sector or page of a corresponding block is coincident with the data offset of the write operation, the data is sequentially written starting from the first sector or page (S150), and the block state of the corresponding block is converted to a block M (S160).

On the other hand, if the sector or page coincident with the data offset of the write operation does not exist, or the first sector or page of a corresponding block is not coincident with the data offset of the write operation, the control unit 140 performs data writing in order starting from the first sector or page of the corresponding block (S170), and the block state of the corresponding block is converted to a block N (S180).

As described above, if the sector or page coincident with the data offset of the write operation exists, the data is sequentially written in an empty sector of the small block flash memory in order starting from the first sector or page of the corresponding block. If the write voltage is applied to an empty page of the large block flash memory to write the data, it is likely that the data written in previous and next pages of a corresponding page may be changed by the applied write voltage. Therefore, the data is sequentially written in the large block flash memory.

In the data writing method of FIG. 9, the block for writing the data is a block M or block N. If the sector or the page does not exist any longer, the procedure of the aforementioned swap merge or smart merge may be performed. At this time, if the sector or page for writing the data does not exist in a block M or block N, a new block F is assigned. In this case, the new block F, in which no data has been written, may be assigned or the aforementioned block O may be assigned through an erase operation.

Figure 10:
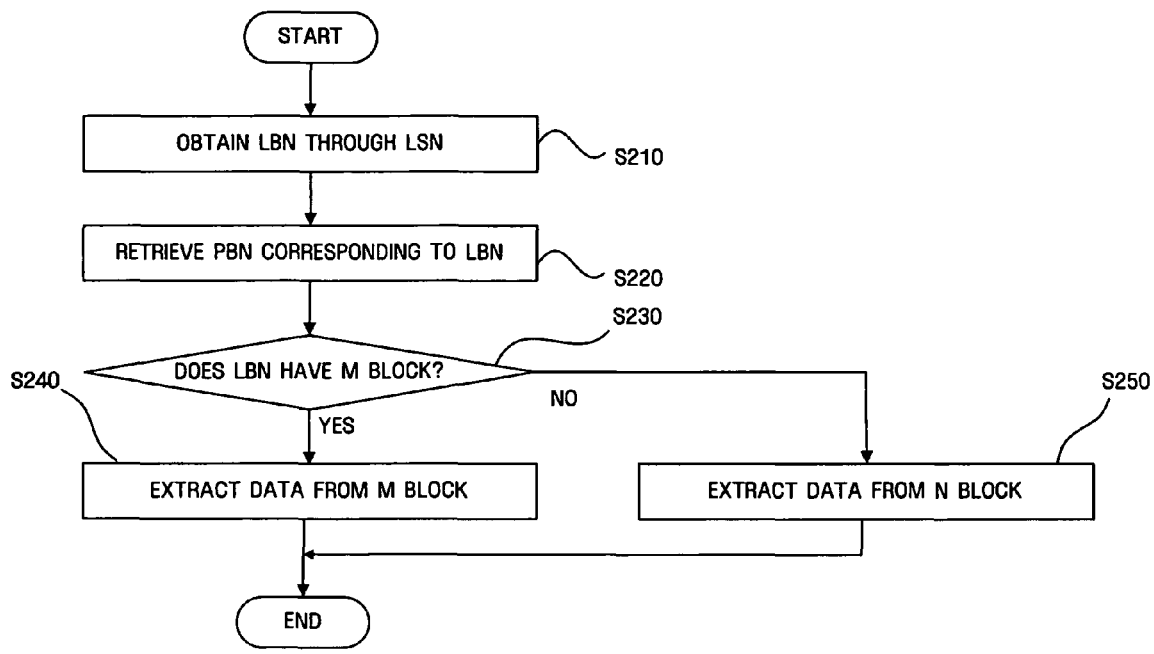
FIG. 10 is a view illustrating a method of reading data of a flash memory according to an exemplary embodiment.

FIG. 10 is a view illustrating a method of reading data using the mapping control method of the flash memory according to an exemplary embodiment. If a data read operation having an LSN is requested by the user, the control unit 140 obtains the LBN according to the LSN (S210). Afterwards, the control unit 140 retrieves the PBN corresponding to the LBN obtained by the mapping table in the initial procedure (S220).

Furthermore, the control unit 140 determines whether the LBN has an M block or N block (S230). If the LBN has an M block, the control unit 140 extracts data from a corresponding sector or page of the M block S240.

If the LBN has an N block (i.e., does not have an M block), the control unit 140 extracts data from a corresponding sector or page of an N block S250.

At this time, the mapping data in an M block or N block can be written in a sector or page of a corresponding block by the mapping table. The control unit 140 can extract data from a corresponding sector or page through a mapping table written when reading the data of an M block or N block.

As described above, the nonvolatile memory and the mapping control apparatus and method of the same has the advantage that since the block for a data operation can be determined by the block state information, it is possible to improve throughput of the nonvolatile memory.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A nonvolatile memory comprising:
   a data area in which data is written; and
   a preliminary area in which block state information is written, wherein the block state information includes a first state about a block F in which no data is written, a second state about of a block M in which sector offsets of the written data coincide with each other, a third state about of a block N in which sector offsets of the written data do not coincide with each other, and a fourth state about of a block O in which the written data is not effective any longer,
   wherein the block F is converted to the block M or the block N, and then the block M or the block N is converted to the block O, whereby a transition procedure of the block state information from the block F to the block O is performed within two operations.

2. The nonvolatile memory as claimed in claim 1, wherein the second state represents that the data is sequentially written starting from a position of a corresponding block.

3. The nonvolatile memory as claimed in claim 1, wherein data is written by assigning a new block if a corresponding block is completely used in the second state.

4. The nonvolatile memory as claimed in claim 1, wherein an erase operation erases a block of the fourth state, and the erased block is newly assignable if a corresponding block is completely used in the second state.

5. A mapping control apparatus comprising:
- a nonvolatile memory that comprises an area comprising blocks, and that stores block state information that represents a state of written data; and
- a control unit that determines a block for which a data operation can be performed through the block state information when the data operation is performed in the nonvolatile memory, and that updates the block state information depending on a result of the performed data operation,
- wherein the block state information includes a first state about a block F in which no data is written, a second state about of a block M in which sector offsets of the written data coincide with each other, a third state about of a block N in which sector offsets of the written data do not coincide with each other, and a fourth state about of a block O in which the written data is not effective any longer,
- wherein the block F is converted to the block M or the block N, and then the block M or the block N is converted to the block O, whereby a transition procedure of the block state information from the block F to the block O is performed within two operations.

6. The mapping control apparatus as claimed in claim 5, wherein the second state represents that the data has been sequentially written starting from a position of a corresponding block.

7. The mapping control apparatus as claimed in claim 5, wherein the control unit performs the data operation by assigning a new block if a corresponding block has been completely used in the second state.

8. The mapping control apparatus as claimed in claim 5, wherein the control unit erases a block of the fourth state through an erase operation, and newly assigns the erased block if a corresponding block is completely used in the second state.

9. A mapping control method comprising:
- requesting a data operation through a logical sector number of a nonvolatile memory; and
- determining a block for which the data operation can be performed through block state information of a physical block according to the logical sector number; and
- updating the block state information based on a result of the data operation, wherein the block state information includes a first state about a block F in which no data is written, a second state about of a block M in which sector offsets of the written data coincide with each other, a third state about of a block N in which sector offsets of the written data do not coincide with each other, and a fourth state about of a block O in which the written data is not effective any longer,
- wherein the block F is converted to the block M or the block N, and then the block M or the block N is converted to the block O, whereby a transition procedure of the block state information from the block F to the block O is performed within two operations.

10. The mapping control method as claimed in claim 9, wherein the updating the block state information comprises performing the data operation by assigning a new block if a corresponding block has been completely used in the second state.

11. The mapping control method as claimed in claim 9, wherein the data operation is performed such that the data is sequentially written starting from a position of a corresponding block.

12. The mapping control method as claimed in claim 9, wherein the updating the block state information comprises erasing a block of the fourth state through an erase operation, and newly assigning the erased block if a corresponding block has been completely used in the second state.

13. A storage medium storing a program for executing a mapping control method, the method comprising:
- requesting a data operation through a logical sector number of a nonvolatile memory; and
- determining a block for which the data operation can be performed through block state information of a physical block according to the logical sector number; and
- updating the block state information based on a result of the data operation, wherein the block state information includes a first state about a block F in which no data is written, a second state about of a block M in which sector offsets of the written data coincide with each other, a third state about of a block N in which sector offsets of the written data do not coincide with each other, and a fourth state about of a block O in which the written data is not effective any longer,
- wherein the block F is converted to the block M or the block N, and then the block M or the block N is converted to the block O, whereby a transition procedure of the block state information from the block F to the block O is performed within two operations.

* * * * *